United States Patent

Rozinaj et al.

[11] Patent Number: 5,818,928
[45] Date of Patent: Oct. 6, 1998

[54] METHOD AND CIRCUIT ARRANGEMENT FOR DETECTING SPEECH IN A TELEPHONE TERMINAL FROM A REMOTE SPEAKER

[75] Inventors: Gregor Rozinaj; Peter Fesseler, both of Stuttgart, Germany

[73] Assignee: Alcatel N.V., Rijswijk, Netherlands

[21] Appl. No.: 724,795

[22] Filed: Oct. 2, 1996

[30] Foreign Application Priority Data

Oct. 13, 1995 [DE] Germany .......................... 195 38 187.4

[51] Int. Cl.$^6$ ................ H04M 1/00; H04B 3/20
[52] U.S. Cl. .................. 379/410; 704/228; 379/406; 379/444; 381/66
[58] Field of Search ................... 704/215, 226, 704/227, 228, 233, 234, 248, 253; 379/406, 410, 414, 444, 411; 381/66

[56] References Cited

U.S. PATENT DOCUMENTS

| 4,167,653 | 9/1979 | Araseki et al. | 704/233 |
| 4,357,491 | 11/1982 | Daaboul et al. | 704/223 |
| 5,359,653 | 10/1994 | Walker et al. | 379/390 |
| 5,587,998 | 12/1996 | Velardo, Jr. et al. | 370/289 |
| 5,633,936 | 5/1997 | Oh | 381/66 |
| 5,649,012 | 7/1997 | Gupta et al. | 379/410 |
| 5,649,055 | 7/1997 | Gupta et al. | 704/233 |

FOREIGN PATENT DOCUMENTS

| 21 37 127 | 2/1972 | Germany . |
| 28 56 789 | 7/1979 | Germany . |
| 393 426 | 10/1991 | Germany . |
| 41 30 045 | 3/1993 | Germany . |
| 38 77 384 | 5/1993 | Germany . |
| 42 36 408 | 5/1994 | Germany . |

OTHER PUBLICATIONS

James L. Flanagan, Speech Analysis and Perception, pp. 165–168, Oct. 1972.
"Signalverarbeitungsverfahren Zur Verbesserung Der Sprachkommunikation Uber Freisprecheinrichtungen", R. Wehrmann et al, 48th Year, Oct. 1994, pp. 27–28.
"Kombination Von Gerauschreduktion Und Echokompensation Beim Freisprechen", T. Huhn et al, Communications Technology and Electronics, Berlin 43 (1993), pp. 274–280.

Primary Examiner—Daniel S. Hunter
Assistant Examiner—Charles N. Appiah
Attorney, Agent, or Firm—Frishauf, Holtz, Goodman, Langer & Chick

[57] ABSTRACT

In communication networks with transmission devices using analog circuitry, because of unadapted 4-wire/2-wire junctions, some of the speech of a local speaker is reflected back to the local speaker as a line echo. This line echo is neutralized by echo compensators. However, updating of the filter coefficients of the echo compensators cannot be allowed to occur unless speech of the far-end speaker is absent. Thus, recalculation of the filter coefficients must be precluded at other times. Various possibilities for detecting the speech of a local speaker are well known. According to the invention, detection of the speech of a far-end speaker is fed back to obtain an attenuation measurement of the transmission path; this received speech simulates a reduction in attenuation. From the difference between the long-time average (Aa(k+1)) and the short-time average (A(k+1)) of the attenuation, it is learned very quickly, by comparison with a threshold (THRe), whether speech is present or not. The method is also applicable in order to discontinue automatic voice output on the local end by means of duplex voice communication.

5 Claims, 2 Drawing Sheets

METHOD AND CIRCUIT ARRANGEMENT FOR DETECTING SPEECH IN A TELEPHONE TERMINAL FROM A REMOTE SPEAKER

FIELD OF THE INVENTION

BACKGROUND OF THE INVENTION

The invention relates to a method and a circuit arrangement for detecting speech in a telephone terminal from a speaker located at the far end of a transmission path of a communications system. Detecting speech is the prerequisite for instance for correctly determining the transfer function of an echo compensator in a hands-free voice input device of a telephone terminal.

One essential problem in hands-free voice input devices results from the acoustical coupling between the loudspeaker and the microphone of the telephone terminal, if some of the received signal output by the loudspeaker travels through the air and possibly via a housing to the microphone and thus comes back to the speaker on the far end of the transmission path. There the signal is perceived as an annoying echo, hereinafter called a local echo, if the intensity and transit time exceed certain limits.

In communications networks in which both digital and analog transmission devices are used, 4-wire/2-wire junctions occur, which are embodied as splitter circuits and in which misadaptation is technically unavoidable. These misadaptations lead to signal reflections along the transmission path, so that the local speaker hears echoes, hereinafter called line echo, which depending on the intensity and time lag compared with the transmitted signal has a very annoying effect on conversion.

DESCRIPTION OF THE PRIOR ART

It is known in principle to eliminate the effect of annoying echoes by using echo compensators; see R. Wehrmann and others, "Signal für Arbeitungsverfahren zur Verbesserung der Sprachkommunikation über Freisprecheinrichtungen" [Signal Processing Methods to Improve Speech Communication Via Hands-free Voice Input Devices], Der Fernmelde-Ingenieur [Telecommunications Engineer], 48th year, October 1994, pp. 27–28. Based on the recognition that the source of the local echo is the acoustical coupling between the loudspeaker and the microphone, and that the source of line echo is the electrical coupling between a transmit line and a receive line, the attempt is made with an echo compensator to simulate the transmission function of the actual loudspeaker and microphone or line and line system. The signal arriving at the subscriber then travels through both the real system and the system simulated by the echo compensator. The output signal of the echo compensator is then subtracted from the echo-carrying signal of the real system, thus largely compensating for the echo.

To realize echo compensators, digital filters are used whose filter coefficients can be determined by the normalized least mean square algorithm, or NLMS algorithm for short; see T. Huhn and H.-J. Jentschel: "Kombination von Geräuschreduktion und Echokompensation bei Freisprechen" [Combining Noise Reduction and Echo Compensation in Hands-free Operation], Nachrichtentechnik, Elektronik [Communications Technology and Electronics], Berlin 43 (1993), pp. 274–280. A difficulty in determining the filter coefficients is that the current pulse response of the simulated system only must be determined when an echo is present. Hence there is a need to distinguish highly reliably between local echoes and local noise or an active local speaker, and between line echoes and an active far-end speaker, so that filter coefficients are determined only when both the local speaker and the far-end speaker are silent, because at such times it is essentially only echo signals that are being received.

For recognizing speech of a local speaker, it is known to use a comparator which detects input signals that are above a reference level as speech; see German Patent Disclosure DE-OS 2 137 127. If the input signal drops below this level, a pause in speech is assumed. Although such a method is suitable for detecting an active local speaker, it does not yield a usable result in detecting an active far-end speaker. When there is duplex voice communication and also low volume on the part of the far-end speaker, an unequivocal distinction between speech and line echo in the received signal cannot be made if a fixed threshold is used as the distinguishing characteristic.

SUMMARY OF THE INVENTION

It is accordingly an object to disclose a method for detecting speech of a speaker located on the far end of a transmission path, with which, in the hands-free voice input device of a telephone terminal, a fast and reliable distinction between speech of the far-end speaker and echo of the local speaker can be made at the beginning of the transmission path.

This object is attained by the method and by the circuit arrangement described in the present invention.

Briefly, the detection of the speech phases of the far-end speaker is fed back to an attenuation measurement, which advantageously furnishes a precise result after only a few sample values of the transmitted signal and the received signal.

DETAILED DESCRIPTION OF THE EMBODIMENTS

Figure 1:
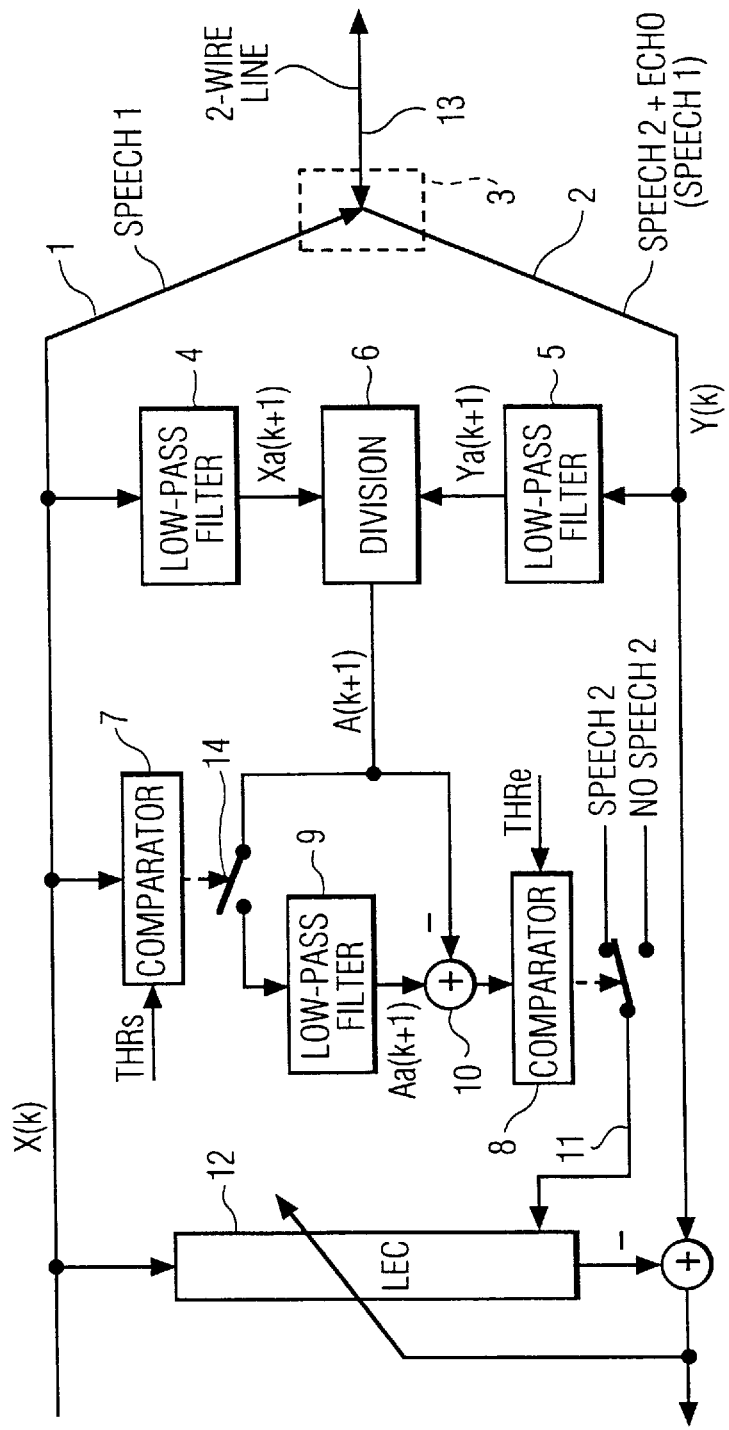
FIG. 1 is a function circuit diagram of the circuit arrangement according to the invention for use for an echo compensator.

In FIG. 1, the circuit arrangement according to the invention is located in a telephone terminal between a transmit line 1 and a receive line 2. The transmit line 1 and the receive line 2 lead via a 4-wire/2-wire splitter circuit 3 to the speaker on the far end of the transmission path. The circuit arrangement according to the invention essentially comprises a first averaging device 4, a second averaging device 5 and a quotient or divider device 6, as well as a first comparator 7, a second comparator 8, and a summing circuit 10. The output 11 of the circuit arrangement is connected to an echo compensator 12. The averaging devices 4, 5 and 9 may be low pass filters.

To the extent necessary for comprehension of the solution provided by the invention, the transmission path to the far-end speaker is represented by a 2-wire line 13. The speech I of the local speaker is transmitted over the transmit line 1 to the far-end speaker. Via the receive line 2, either the echo, originating in the speech I of the local speaker, or the speech II of the far-end speaker, or both are received.

The function of the circuit arrangement and the individual steps in the method will now be described. First, the attenuation of the transmission path between the microphone output and the loudspeaker input is determined from the speech I of the local speaker or from ambient noise on the local side and the echo originating in either speech I of the local speaker or the ambient noise. In general, this attenuation is constant. When a natural dialog between the local speaker and a far-end speaker is taking place, in which phases of duplex voice communication also occur, the signal received over the receive line 2 comprises superimposed echoes and the speech II of the far-end speaker, so that measuring the attenuation under these conditions produces a lesser value. These measured values deviating from one another are the basis for the method of the invention.

To determine the attenuation, an average $Xa(k+1)$ is determined from the sampled value of the transmission signal $X(k)$ appearing on line 1 by the first averaging device 4. To preclude incorrect measurements, it must be assured that an evaluated transmission signal $X(k)$ is present. To that end, the value of the transmitted signal $X(k)$ appearing on line 1 is compared with a threshold value THRs in the first comparator 7, and the evaluation of the measurement result 14 is admitted if the threshold value THRs is exceeded by the value of the transmission signal $X(k)$. By way of example, the averaging is done by an infinite impulse response or IIR low-pass filter, by the following formula:

$$Xa(k+1) = Xa(k) + \frac{X(k) + Xa(k)}{M} \quad (1)$$

$$= Xa(k) + \frac{X(k)}{M} + \frac{Xa(k)}{M}$$

$$= \left(1 - \frac{1}{M}\right) Xa(k) + \frac{1}{M} \cdot X(k)$$

$$1 - \frac{1}{M} = B1 \frac{1}{M} = A1$$

$$A1 = 1 - B1$$

The symbols in the formula have the following meanings:
$Xa(k+1)$ Output value of the low-pass filter, present at the time of calculation.
$Xa(k)$ Valid output value of the low-pass filter before the calculation time.
$X(k)$ Current input value of the low-pass filter.
B1 Time constant of the low-pass filter.

By the same formula, the average of the sample signals $Y(k)$ of the received signal on line 2, which originates in the echo in the transmitted signal, is found using the second averaging devices.

$$Ya(k+1) = (1 - 1/M)Ya(k) + 1/M Y(k) \quad (2)$$

From the quotients of the results of equations (1) and (2), a short-time average $A(k+1)$ of the attenuation of the transmission path is ascertained by means of the quotient device 6.

$$A(k+1) = \frac{Xa(k+1)}{Ya(k+1)} \quad (3)$$

If a suitable sample value $X(k)$ of the transmitted signal is present, then a long-time average $Aa(k+1)$ of the attenuation is formed by the third averaging device 9 in accordance with the following formula:

$$Aa(k+1) = (1 - 1/N)Aa(k) + 1/N A(k) \quad (3)$$

where mit $1 - 1/N = B2 \, 1/N = A1$
and the time constant $B2 > B1$.

The difference between the long-time average of the attenuation $Aa(k+1)$ and the short-time average of the attenuation $A(k+1)$, formed in a summer 10, is now compared with a threshold value THRe by means of the second comparator 8.

If the difference $Aa(k+1) - A(k+1)$ is greater than the threshold value THRe, then the received signal is formed by the speech II of the speaker at the far end of the transmission path; if the difference $Aa(k+1) - A(k+1)$ is less than the threshold value THRe, then the received signal is formed by an echo of the transmitted signal. Since the attenuation of the transmission path is substantially constant, the measured short-time averages of the attenuation $A(k+1)$ deviate not at all or only slightly from one another if an echo is present, and thus the long-time average $Aa(k+1)$ becomes approximately equal to the short-time average $A(k+1)$. The difference between the long-time average $Aa(k+1)$ and short-time average $A(k+1)$ is very stable and relatively slight in the case of an echo and is thus below the threshold THRe.

Conversely, if the received signal is formed by the speech II of the far-end speaker, then the sample values $Y(k)$ incorrectly indicate attenuation less than the actual attenuation present, and thus on the one hand the short-time average of the attenuation $A(k+1)$ becomes less, and on the other, the short-time averages change as a result of the greater dynamics of speech compared with the echo. The dynamics of speech lead to a greater long-time average of the attenuation $Aa(k+1)$ compared with the short-time averages of the attenuation $A(k+1)$, and thus to a greater difference between the long-time average and the short-time average, which is then above the threshold THRe.

The method thus makes it possible to detect the speech II of the far-end speaker, and in this case to prevent the updating of the coefficients of the FIR filter in the echo compensator 12.

This updating takes place if in fact only an echo is received. If the measured attenuation values fluctuate, for instance from noise signals on the receive line 2, then the updating of the filter coefficients is discontinued.

Figure 2:
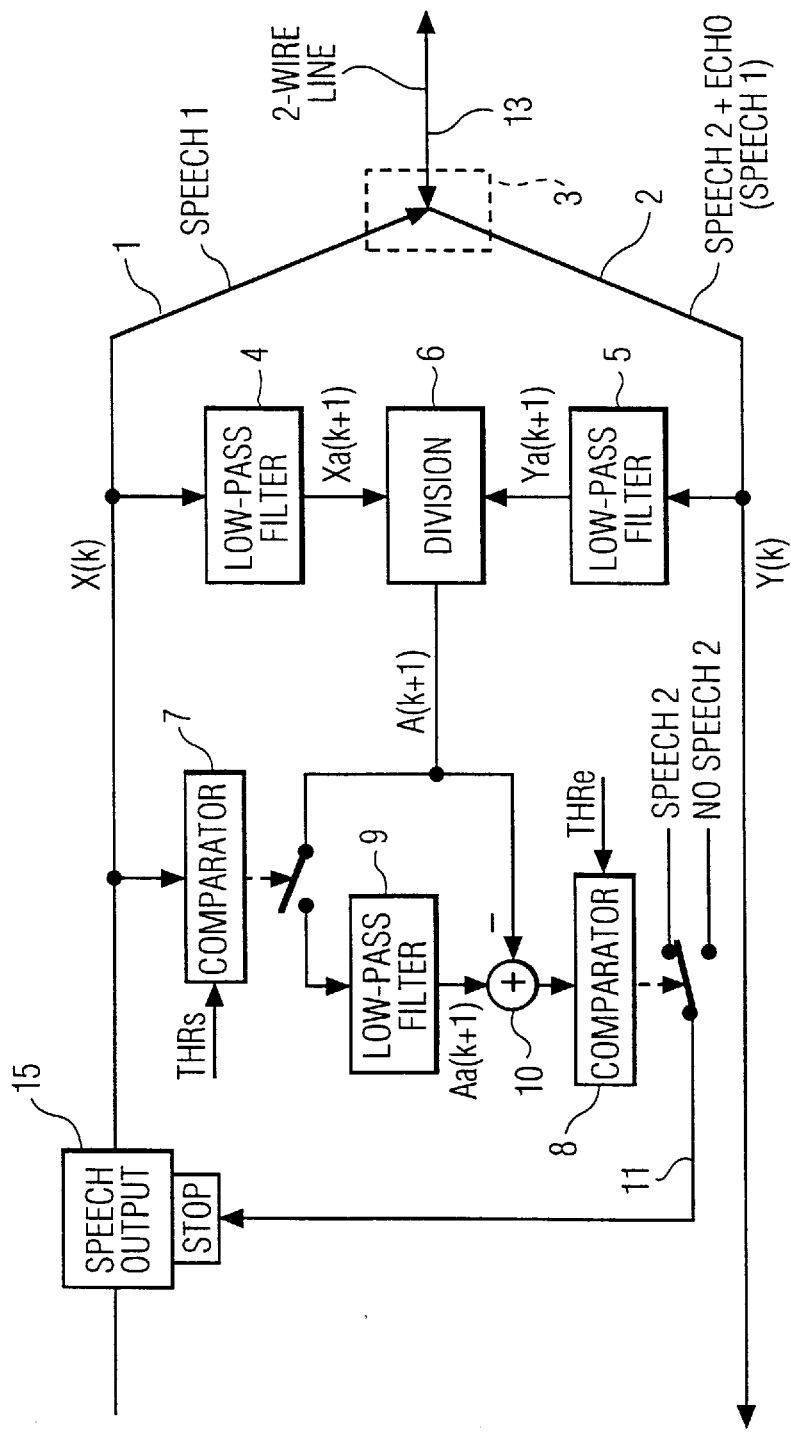
FIG. 2 is a function circuit diagram of the circuit arrangement according to the invention for use for a voice output unit.

FIG. 2 essentially shows the same circuit arrangement as FIG. 1, but here the detected speech II of the far-end speaker is used to discontinue voice output 15 on the local end.

This is of practical use if the far-end speaker is listening to an announcement text of an automatic telephone answering machine, for instance, which he can stop as needed by means of duplex voice communication.

In comparison with the prior art, with the method of the invention and the associated circuit arrangement, speech from the far-end speaker can advantageously be detected very fast, for instance in less than 5 ms, so that incorrect adjustments of the echo compensator 12 can be avoided. The circuit arrangement can be realized at very little expense.

We claim:
1. A method of detecting speech in a telephone terminal from a speaker located at a far end of a transmission path of a communications system wherein acoustoelectrically converted and coded signals ($Y(k)$) from said speaker are received by the telephone terminal via a receive line (2), and wherein acoustoelectrically converted and coded signals ($X(k)$) from a local speaker or originating from ambient noise are transmitted by the telephone terminal over a transmit line (1) toward said speaker at the far end of the transmission path, said method comprising:
 determining an average ($Xa(k+1)$) of sample values of the signal ($X(k)$) transmitted by the telephone terminal;
 determining an average ($Ya(k+1)$) of sample values of the signal ($Y(k)$) received by the telephone terminal;
 determining a quotient ($A(k+1)$) representing a short-time average of attenuation of the transmission path by dividing the average ($Xa(k+1)$) of the transmitted signal ($X(k)$) by the average ($Ya(k+1)$) of the received signal ($Y(k)$);

determining an average ($Aa(k+1)$) of the quotient ($A(k+1)$) representing a long-time average of the attenuation of the transmission path; and determining a difference between the long-time average ($Aa(k+1)$) and the short-time average ($A(k+1)$) of the attenuation, and comparing the difference with a threshold value (THRe), wherein if the difference is less than the threshold value (THRe) it is determined that the received signal ($Y(k)$) originates from a line echo, and wherein if the difference is greater than the threshold value (THRe) it is determined that the received signal ($Y(k)$) originates from said speaker at the far end of the transmission path.

2. The method as claimed in claim 1, further comprising updating coefficients of a digital filter during periods in which the difference between the long-time average ($Aa(k+1)$) and the short-time average ($A(k+1)$) of the attenuation is less than the threshold value (THRe).

3. The method as claimed in claim 1, further comprising interrupting transmission of an automatic voice output unit (15) if the difference between the long-time average ($Aa(k+1)$) and the short-time average ($A(k+1)$) of the attenuation is greater than the threshold value (THRe).

4. A circuit arrangement for carrying out the method recited in claim 1, comprising:

a first averaging device (4) and a second averaging device (5), said first averaging device having an input coupled to the transmit line (1) and said second averaging device (5) having an input coupled to the receive line (2);

a quotient device (6) having inputs coupled to outputs of each of said first and second averaging devices (4, 5);

a third averaging device (9) having an input coupled to an output of said quotient device (6) via a switch (14) controlled by a first comparator (7), said first comparator (7) having an input coupled to the transmit line (1);

a second comparator (8) having an input coupled to the output of said quotient device (6) via a summer (10), said summer (10) being coupled to an output of said third averaging device (9); and an output (11) coupled to said second comparator (8) for outputting a signal indicating whether said speaker at the far end of the transmission path is speaking or silent.

5. The circuit arrangement as claimed in claim 4, wherein respective time constants of the first and second averaging devices (4, 5) are less than a time constant of the third averaging device (9).

* * * * *